United States Patent
Kazeto et al.

(10) Patent No.: US 9,605,130 B2
(45) Date of Patent: *Mar. 28, 2017

(54) RESIN COMPOSITION, MOLDED ARTICLE, MULTILAYERED PIPE AND METHOD FOR PRODUCING THE SAME

(71) Applicant: KURARAY CO., LTD., Kurashiki-shi (JP)

(72) Inventors: Osamu Kazeto, Kurashiki (JP); Wataru Hirose, Kurashiki (JP)

(73) Assignee: KURARAY CO., LTD., Kurashiki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/843,158

(22) Filed: Sep. 2, 2015

(65) Prior Publication Data

US 2015/0376372 A1 Dec. 31, 2015

Related U.S. Application Data

(63) Continuation of application No. 13/638,659, filed as application No. PCT/JP2011/058005 on Mar. 30, 2011, now Pat. No. 9,290,636.

(30) Foreign Application Priority Data

Mar. 31, 2010 (JP) ................. 2010-082903

(51) Int. Cl.
| | |
|---|---|
| *B32B 1/08* | (2006.01) |
| *C08K 5/09* | (2006.01) |
| *F16L 9/14* | (2006.01) |
| *C08K 5/00* | (2006.01) |
| *B29C 44/12* | (2006.01) |
| *B29C 47/00* | (2006.01) |
| *B29C 47/06* | (2006.01) |
| *B32B 5/18* | (2006.01) |
| *B32B 27/30* | (2006.01) |
| *C08K 5/20* | (2006.01) |
| *F16L 59/14* | (2006.01) |
| *B32B 1/02* | (2006.01) |
| *B29K 23/00* | (2006.01) |
| *B29K 75/00* | (2006.01) |
| *B29K 105/04* | (2006.01) |
| *B29L 23/00* | (2006.01) |

(52) U.S. Cl.
CPC ............ *C08K 5/09* (2013.01); *B29C 44/1228* (2013.01); *B29C 47/0023* (2013.01); *B29C 47/06* (2013.01); *B32B 1/08* (2013.01); *B32B 5/18* (2013.01); *B32B 27/306* (2013.01); *C08K 5/005* (2013.01); *C08K 5/20* (2013.01); *F16L 9/14* (2013.01); *F16L 59/14* (2013.01); *B29K 2023/086* (2013.01); *B29K 2075/00* (2013.01); *B29K 2105/04* (2013.01); *B29K 2995/0067* (2013.01); *B29L 2023/225* (2013.01); *B32B 2266/0278* (2013.01); *B32B 2307/304* (2013.01); *B32B 2307/714* (2013.01); *B32B 2307/7242* (2013.01); *B32B 2597/00* (2013.01); *C08K 2201/008* (2013.01); *Y10T 428/1376* (2015.01); *Y10T 428/1393* (2015.01)

(58) Field of Classification Search
CPC B32B 1/08; B32B 5/18; B32B 27/306; B32B 2266/0278; B32B 2307/304; B32B 2307/714; B32B 2307/7242; B32B 2597/00; Y10T 428/1352; Y10T 428/1393; Y10T 428/1376; F16L 9/14; F16L 59/14

See application file for complete search history.

(56) References Cited

U.S. PATENT DOCUMENTS

| | | | |
|---|---|---|---|
| 4,508,162 A | 4/1985 | Radtke | |
| 5,032,632 A | 7/1991 | Saxton | |
| 5,034,253 A | 7/1991 | Miyake et al. | |
| 5,744,547 A | 4/1998 | Moritani et al. | |
| 6,447,858 B1 | 9/2002 | Shimo et al. | |
| 6,793,994 B2 | 9/2004 | Tsai et al. | |
| 9,290,636 B2 * | 3/2016 | Kazeto | ............. C08K 5/09 |
| 2002/0068806 A1 | 6/2002 | Yoshimi | |

(Continued)

FOREIGN PATENT DOCUMENTS

| | | |
|---|---|---|
| EP | 0 634 602 | 1/1995 |
| EP | 0 919 574 | 6/1999 |

(Continued)

OTHER PUBLICATIONS

International Search Report Issued Jul. 5, 2011 in PCT/JP11/58005 Filed Mar. 30, 2011.

(Continued)

*Primary Examiner* — Marc A Patterson
(74) *Attorney, Agent, or Firm* — Oblon, McClelland, Maier & Neustadt, L.L.P.

(57) ABSTRACT

An object of the present invention is to provide a multilayered pipe having a layer comprising a resin composition containing EVOH, which is unlikely to exhibit the occurrence of cracking in the EVOH layer due to oxidative degeneration and has excellent gas barrier property even during long-term usage at high temperatures, and also to provide a resin composition for obtaining the multilayered pipe. The present invention relates to a resin composition containing 0.001 to 5 parts by mass of an antioxidant (B) and 0.00001 to 0.3 parts by mass of a conjugated polyene compound (C) having a molecular weight of 1000 or less, relative to 100 parts by mass of an ethylene-vinyl alcohol copolymer (A).

19 Claims, No Drawings

(56) References Cited

U.S. PATENT DOCUMENTS

| | | |
|---|---|---|
| 2002/0115768 A1 | 8/2002 | Kikuchi et al. |
| 2004/0176536 A1 | 9/2004 | Kikuchi et al. |
| 2004/0204549 A1 | 10/2004 | Yoshimi et al. |
| 2004/0206413 A1* | 10/2004 | Claussen ............... F16L 59/153 138/149 |
| 2007/0275197 A1 | 11/2007 | Chow et al. |
| 2011/0091734 A1 | 4/2011 | Kazeto |
| 2012/0009431 A1 | 1/2012 | Kazeto |
| 2013/0040157 A1 | 2/2013 | Igarashi et al. |

FOREIGN PATENT DOCUMENTS

| | | |
|---|---|---|
| EP | 1 355 103 | 10/2003 |
| EP | 2 554 590 | 2/2013 |
| JP | 61 140691 | 6/1986 |
| JP | 63 286459 | 11/1988 |
| JP | 2 74341 | 3/1990 |
| JP | 4 227744 | 8/1992 |
| JP | 9 71620 | 3/1997 |
| JP | 10-095912 | 4/1998 |
| JP | 2000-102918 | 4/2000 |
| JP | 2000-263712 | 9/2000 |
| JP | 2000 352480 | 12/2000 |
| JP | 2001 41360 | 2/2001 |
| JP | 2001 206999 | 7/2001 |
| JP | 2001-354779 | 12/2001 |
| JP | 2003 12944 | 1/2003 |
| JP | 2003-097772 | 4/2003 |
| JP | 2004 114389 | 4/2004 |
| JP | 2004 526835 | 9/2004 |
| JP | 2005 47105 | 2/2005 |
| JP | 2005 325877 | 11/2005 |
| JP | 2007 314788 | 12/2007 |
| WO | 01 27515 | 4/2001 |
| WO | WO 2004/003423 | 1/2004 |

OTHER PUBLICATIONS

European Office Action issued Jun. 24, 2014, in corresponding European Patent Application No. 11 765 636.3.

Office Action issued Mar. 17, 2015, in corresponding Japanese Patent Application No. 2012-509514 (with English-language Translation).

Office Action (A Notice of Reasons for Rejections) issued in corresponding Japanese Patent Application No. 2014-218540, issued Aug. 18, 2015, (with English-language Translation).

* cited by examiner

RESIN COMPOSITION, MOLDED ARTICLE, MULTILAYERED PIPE AND METHOD FOR PRODUCING THE SAME

REFERENCE TO PRIOR APPLICATIONS

This application is a continuation of U.S. Pat. No. 9,290,636, filed Oct. 1, 2012; which is a 371 of PCT/JP2011/058005, filed Mar. 30, 2011, the disclosures of which are incorporated herein by reference in their entireties. This application claims priority to Japan Patent Application No. 2010-082903, filed Mar. 31, 2010, the disclosure of which is incorporated herein by reference in its entirety.

TECHNICAL FIELD

The present invention relates to a resin composition, a molded article having a layer comprising the resin composition, and a multilayered pipe. Furthermore, the present invention relates to a method for producing the molded article and the multilayered pipe.

BACKGROUND ART

Conventionally, a metallic pipe for hot water circulation is used primarily in floor heating by the hot water circulation method. When laying such a pipe for hot water circulation, the pipe is embedded inside concrete and installed under the floor in most cases, and the maintenance and repair becomes extremely difficult once the pipe has been installed. Furthermore, the pipe is normally required to have a long-term durability of about 50 years. Based on such severe conditions, a use of a plastic pipe that is cheaper than a metallic pipe and also does not involve corrosion of the pipe material is desired. Polyethylene, polypropylene, polybutene, etc., are used as the plastic pipe materials.

However, when such a plastic pipe is used in a floor heating system based on the hot water circulation method, there is a problem of corrosion of the metallic parts of heat exchanger, pump and the like, due to oxygen. A possible reason of this corrosion is that the oxygen present in the atmosphere passes through the plastic walls, and penetrates and dissolves in the hot water circulating within the pipe. Thus, a multilayer polyethylene pipe having aluminum as the intermediate layer is used, but due to cracking of the aluminum layer possibly due to the change in temperature, this multilayered pipe cannot prevent corrosion due to the oxygen.

As a solution to this problem, various multilayered pipes including a plastic resin having excellent oxygen gas barrier property and polyethylene are evaluated. Among these, a multilayered pipe using an ethylene-vinyl alcohol copolymer (hereinafter, may be abbreviated as EVOH) is confirmed to have the highest oxygen barrier property and most excellent mechanical strength, and these days, EVOH multilayer plastic pipes are used widely as pipes for hot water circulation. For example, a hot water circulation pipe including an EVOH layer as the intermediate layer (see Patent document 1: JP 61-140691 A) and a hot water circulation pipe having an EVOH layer as the outermost layer (see Patent document 2: JP 02-74341 A are known.

However, in the case of a hot water circulation pipe, the exposure of the EVOH layer to remarkably high temperatures for a long period of time gradually accelerates oxidation degradation of EVOH due to the oxygen present in the air. Although the oxygen barrier property of EVOH is not seriously affected by a small amount of degradation, the mechanical strength may decline due to oxidation degradation giving rise to cracks parallel to the lengthwise direction of the EVOH layer. When cracking thus occurs as a result of aging degradation, the excellent oxygen barrier property of EVOH is obviously lost, and with these cracks as the starting point, fissures running through the pipe walls might occur. In such a case, the water in the pipe leaks out under the floor causing a big problem.

The addition of an antioxidant is effective against the oxidation degradation of EVOH in the air, and a composition containing EVOH and an amide having a hindered phenol group (see Patent document 3: JP 63-286459 A) as well as a composition in which an aliphatic carboxylic acid containing three to nine carbon atoms and a hindered phenol antioxidant are mixed with EVOH (see Patent document 4: JP 4-227744 A) are known. By making use of these techniques, it becomes possible to extend the life of the hot water circulation pipe to a large extent.

However, in the recent resource-saving and energy-saving trend, where a large increase in the lifespan of household equipment is demanded, the lifespan of the hot water circulation pipes is also desired to be much more.

Furthermore, until now, floor heating by the hot water circulation method is mainly prevalent in western countries such as Northern Europe, but in the recent years, this heating system is gradually beginning to gain popularity in Japan as well. In Japanese houses, there are many restrictions in the floor area for laying down hot water circulation pipes, and in many cases the pipes have to be installed with a small bending radius. Therefore, when secondary processing is performed to bend the pipe, cracking occurs easily in a direction perpendicular to the lengthwise direction of the EVOH layer. Further improvements are necessary even with regard to cracking due to the distortion during such secondary processing.

Furthermore, an insulated multilayered pipe including an inner pipe carrying gas or liquid, an insulation foam layer covering the inner pipe, and an outer pipe covering the insulation foam layer is used as a pipe for district energy (area-wide air conditioning) (see Patent document 5: EP 0634602 A1). Conventionally, the insulation foam layer is surrounded by a foil (film) adhering on to the outer pipe. Examples of the foil include metals such as aluminum, and polyethylene from the viewpoint of a thermoformable material. However, the conventionally used aluminum foil is difficult to handle, and on the other hand, the polyethylene film fails to provide long-term insulation effect without proper permeation prevention of carbon dioxide, pentane, and cyclopentane used in the blowing agent of the insulation foam. Therefore, the use of a multilayered pipe including EVOH having gas barrier property as an outer pipe is being examined from the viewpoint of improvement in handling and permeation prevention of carbon dioxide, pentane, and cyclopentane (see Patent document 6: EP 1355103 A1). However, even the insulated multilayered pipe has a problem of acceleration of oxidation degradation of EVOH due to the oxygen in the air during long-term usage. When the mechanical strength declines and cracks occur parallel to the lengthwise direction of the EVOH layer as a result of oxidation degradation, blowing gas is dispersed from the insulated multilayered pipe and the insulation performance declines. In order to solve such a problem, the EVOH layer is desired to have a long life.

On the other hand, it is disclosed that by using an EVOH resin composition (not a blended composition with polyolefin) containing a conjugated polyene compound having a boiling point of 20° C. or more in EVOH, a molded article with less coloring and less formation of a gel-type object during molding is obtained (see Patent document 7: JP 9-71620 A), but the patent document does not examine the decline in the mechanical strength due to oxidation degradation at high temperatures.

PRIOR ART DOCUMENTS

Patent Documents

Patent document 1: JP 61-140691 A
Patent document 2: JP 2-74341 A
Patent document 3: JP 63-286459 A
Patent document 4: JP 4-227744 A
Patent document 5: EP 0634602 A1
Patent document 6: EP 1355103 A1
Patent document 7: JP 9-71620 A

SUMMARY OF THE INVENTION

Problem to be Solved by the Invention

An object of the present invention is to provide a molded article and a multilayered pipe having a layer including a resin composition containing EVOH, which cause less crack in the EVOH layer due to oxidation degradation and have excellent gas barrier property even during long-term usage at high temperatures, and also to provide a resin composition for obtaining the molded article and the multilayered pipe.

Means for Solving the Problems

The above problem can be solved by providing a resin composition containing 0.001 to 5 parts by mass of an antioxidant (B) and 0.00001 to 0.3 parts by mass of a conjugated polyene compound (C) having a molecular weight of 1000 or less, relative to 100 parts by mass of an ethylene-vinyl alcohol copolymer (A).

The content of the conjugated polyene compound (C) is preferably 0.00005 to 0.2 parts by mass, and more preferably 0.0001 to 0.15 parts by mass. Furthermore, the conjugated polyene compound (C) is preferably at least one type selected from the group consisting of sorbic acid, sorbic acid salt, and myrcene, and more preferably sorbic acid and/or its salt.

The content of the antioxidant (B) is preferably 0.01 to 4 parts by mass. Furthermore, the antioxidant (B) is preferably a compound having a hindered amine group and/or a compound having a hindered phenol group.

A molded article and a multilayered pipe having a layer including the resin composition are also suitable embodiments of the present invention. In the multilayered pipe, the layer including the resin composition is desired to be the outermost layer.

Furthermore, a hot water circulation pipe including the multilayered pipe is also a suitable embodiment of the present invention. An insulated multilayered pipe formed by including an insulation foam layer in the multilayered pipe is also a suitable embodiment of the present invention. Such an insulated multilayered pipe is desired to have a layer including an inner pipe, an insulation foam layer, and a layer including the resin composition, in a sequence from the inner side.

Furthermore, it is preferred that the method for producing the molded article and the multilayered pipe includes a step of cooling by using water having a temperature of 10 to 70° C. immediately after molding.

Effect of the Invention

According to the resin composition of the present invention, it is possible to provide a multilayered pipe having a layer including the resin composition containing EVOH, which cause less crack in the EVOH layer due to oxidation degradation and has excellent appearance and gas barrier property even during long-term usage at high temperatures.

MODE FOR CARRYING OUT THE INVENTION

The embodiments of the present invention will be explained in the order of the resin composition and the method for producing the same, and the molded article and multilayered pipe and the method for producing the same.

[Resin Composition]

The resin composition of the present invention contains an ethylene-vinyl alcohol copolymer (EVOH) (A), an antioxidant (B), and a conjugated polyene compound (C) having a molecular weight of 1000 or less.

(EVOH (A))

EVOH (A) is a copolymer having an ethylene unit and a vinyl alcohol unit as the main structural units. Normally, the EVOH is obtained by copolymerizing ethylene and vinyl ester, and then saponifying the resulting ethylene-vinyl ester copolymer. Particularly, that obtained by saponifying an ethylene-vinyl acetate copolymer is typical.

When the ethylene unit content of the EVOH (A) (that is, the ratio of the number of ethylene units per total number of monomer units in the EVOH) becomes too high, the gas barrier property tends to decline. On the other hand, because the oxidation degradation of the EVOH (A) occurs with the hydroxyl group of the vinyl alcohol units as the base point, oxidation degradation occurs easily when the ethylene unit content is low (the content of the vinyl alcohol units is high). From this viewpoint, the ethylene unit content is desired to be 10 to 65 mol %, with 15 to 60 mol % being more preferable, and 20 to 50 mol % being particularly preferable.

When the degree of saponification of the EVOH (A) (that is, the ratio of the number of vinyl alcohol units per total number of vinyl alcohol units and vinyl ester units in the EVOH) is low, the gas barrier property might deteriorate, and the elimination reaction of carboxylic acid occurs easily under high temperatures. From this viewpoint, the degree of saponification is preferably 96 mol % or more, and more preferably 99 mol % or more. EVOH with a degree of saponification of 99 mol % or more makes it possible to achieve a multilayered pipe with excellent gas barrier property, and is particularly preferred in the present invention.

The EVOH (A) may also include another polymerizable monomer unit to the extent that does not inhibit the effect of the present invention, usually in the range of not 5 mol % or less. Examples of the polymerizable monomer include α-olefins such as propylene, 1-butene, 1-hexene, and 4-methyl-1-pentene; (metha)acrylic acid esters; unsaturated carboxylic acids such as maleic acid, fumaric acid, and itaconic acid; alkyl vinyl ethers; N-(2-dimethylaminoethyl) methacrylamide or its quaternary compounds, N-vinylimidazole or its quaternary compounds, N-vinylpyrrolidone, N,N-butoxymethylacrylamide, vinyltrimethoxysilane, vinylmethyldimethoxysilane, vinyldimethylmethoxysilane, and the like.

The melt index (MI; measured at 190° C., under a load of 2160 g) of the EVOH (A) is not particularly limited, and preferably is in the range of 0.1 to 100 g/10 minutes, more preferably is 0.5 to 50 g/10 minutes, and particularly preferably is 1.0 to 30 g/10 minutes. By setting the melt index of the EVOH (A) in the above-mentioned range, the melt formability of the resin composition thus obtained can be improved, and a multilayered pipe with excellent appearance can be obtained. EVOH having a melt point close to or exceeding 190° C. is measured under a load of 2160 g and at a plurality of temperatures above the melt point, and the reciprocal of the absolute temperature is plotted on the horizontal axis while the logarithm of MFR is plotted on the vertical axis of a semilog graph, and the MFR is expressed by values extrapolated at 190° C.

(Antioxidant (B))

The antioxidant (B) is a compound having antioxidant capacity. Although the melt point of the antioxidant (B) is not necessarily limited, it is desired to be 170° C. or less. If the melt point of the antioxidant (B) exceeds 170° C., when a resin composition is produced by melt blending, the antioxidant (B) may localize in the resin composition because it doesn't melt in an extruder, and the high-concentration portions in the resin composition may be colored.

The molecular weight of the antioxidant (B) is preferably 300 or more. When the molecular weight is below 300, the antioxidant might bleed out on the surface of the molded article and the multilayered pipe that are obtained, possibly resulting in poor appearance of the molded article and the multilayered pipe, and the thermal stability of the resin composition also declines easily. The molecular weight is preferably 400 or more, and particularly preferable is 500 or more. On the other hand, the upper limit of the molecular weight of the antioxidant (B) is not particularly limited, but from the viewpoint of dispersibility, 8,000 or less is preferable, 6,000 or less is more preferable, and 4,000 or less is particularly preferable.

A compound having a hindered phenol group is suitable to be used as the antioxidant (B). While on one hand a compound having a hindered phenol group has excellent thermal stability, it also has the ability to capture the oxygen radical that is the cause of oxidation degradation, and when blended with the resin composition as an antioxidant, the compound exhibits an excellent effect of preventing oxidation degradation.

Commercially available products, for example those described below, can be used as the compound having a hindered phenol group.

(1) "IRGANOX 1010" manufactured by BASF: Pentaerythritol tetrakis[3-(3,5-di-tert-butyl-4-hydroxyphenyl) propionate] with a melt point in the range of 110 to 125° C. and a molecular weight of 1178

(2) "IRGANOX 1076" manufactured by BASF: Octadecyl-3-(3,5-di-tert-butyl-4-hydroxyphenyl)-propionate with a melt point in the range of 50 to 55° C. and a molecular weight of 531

(3) "IRGANOX 1098" manufactured by BASF: N,N'-hexane-1,6-diylbis[3-(3,5-di-tert-butyl-4-hydroxyphenyl) propionamide)] with a melt point in the range of 156 to 161° C. and a molecular weight of 637

(4) "IRGANOX 245" manufactured by BASF: Triethylene glycol-bis[3-(3-tert-butyl-5-methyl-4-hydroxyphenyl)propionate] with a melt point in the range of 76 to 79° C. and a molecular weight of 587

(5) "IRGANOX 259" manufactured by BASF: 1,6-hexanediol-bis[3-(3,5-di-tert-butyl-4-hydroxyphenyl)propionate] with a melt point in the range of 104 to 108° C. and a molecular weight of 639

(6) "Sumilizer MDP-s" manufactured by Sumitomo Chemical Co., Ltd.: 2,2'-methylene-bis(4-methyl-6-tert-butylphenol) with a melt point of about 128° C. and a molecular weight of 341

(7) "Sumilizer GM" manufactured by Sumitomo Chemical Co., Ltd.: 2-tert-butyl-6-(3-tert-butyl-2-hydroxy-5-methylbenzyl)-4-meth ylphenyl acrylate with a melt point of about 128° C. and a molecular weight of 395

(8) "Sumilizer GA-80" manufactured by Sumitomo Chemical Co., Ltd.: 3,9-bis[2-{3-(3-tert-butyl-4-hydroxy-5-methylphenyl)propionyloxy}-1,1-dimethylethyl]-2,4,8,10-tetraoxaspiro[5,5]undecane with a melt point of about 110° C. and a molecular weight of 741

A compound having a hindered amine group is also suitable to be used as the antioxidant (B). When a compound having a hindered amine group is blended with the resin composition as the antioxidant (B), the compound does not just prevent heat degradation of EVOH, but also exhibits the effect of capturing the aldehyde generated as a result of thermal decomposition of EVOH, and can inhibit generation of a void or air bubble during molding by reducing generation of decomposition gases. Furthermore, when the resin composition of the present invention is used as a food packaging container, the problem of spoiling of the taste of the content due to the smell of the aldehyde is solved because of the capture of the aldehyde.

A piperidine derivative is preferably used as the compound having a hindered amine group, and particularly, a 2,2,6,6-tetraalkyl piperidine derivative having a substituent group at the fourth position is preferable. A carboxyl group, an alkoxy group, or an alkylamino group can be used as the substituent at the fourth position.

Furthermore, an alkyl group may be substituted at the N-position of the hindered amine group, but the use of the compound having a hindered amine group, where a hydrogen atom is bonded at the N-position is preferable due to an excellent heat stabilizing effect.

Commercially available products, for example those described below, can be used as the compound having a hindered amine group.

(9) "TINUVIN 770" manufactured by BASF: Bis(2,2,6,6-tetramethyl-4-piperidyl) sebacate with a melt point in the range of 81 to 85° C. and a molecular weight of 481

(10) "TINUVIN 765" manufactured by BASF: Bis(1,2,2,6,6-pentamethyl-4-piperidyl) sebacate, which is a liquid compound with a molecular weight of 509, and 1,2,2,6,6-pentamethyl-4-piperidyl sebacate (mixture)

(11) "TINUVIN 622LD" manufactured by BASF: Polycondensate of dimethyl succinate and 1-(2-hydroxyethyl)-4-hydroxy-2,2,6,6-tetramethylpiperidine with a melt point in the range of 55 to 70° C. and a molecular weight of 3100 to 4000

(12) "CHIMASSORB 119FL" manufactured by BASF: Condensate of N,N'-bis(3-aminopropyl)ethylenediamine and 2,4-bis[N-butyl-N-(1,2,2,6,6-pentamethyl-4-piperidyl) amino]-6-chloro-1,3,5-triazine with a melt point in the range of 130 to 140° C. and a molecular weight of 2000 or more

(13) "CHIMASSORB 944LD" manufactured by BASF: poly[[6-(1,1,3,3-tetramethylbutyl)amino-1,3,5-triazin-2,4-diyl](2,2,6,6-tetramethyl-4-piperidyl)imino]hexamethylene (2,2,6,6-tetramethyl-4-piperidyl)imino]] with a melt point in the range of 100 to 135° C. and a molecular weight between 2000 and 3100

(14) "TINUVIN 144" manufactured by BASF: Bis(i, 2,2,6, 6-pentamethyl-4-piperidyl) [[3,5-bis(1,1-dimethylethyl)-4-hydroxyphenyl]methyl]butyl malonate with a melt point in the range of 146 to 150° C. and a molecular weight of 685

(15) "UVINUL 4050H" manufactured by BASF: N,N'-1,6-hexanediylbis {N-(2,2,6,6-tetramethyl-4-piperidinyl)formamide} with a melt point of 157° C. and a molecular weight of 450

(16) "UVINUL 5050H" manufactured by BASF: Compound having the following structure with a melt point in the range of 104 to 112° C. and a molecular weight of about 3500

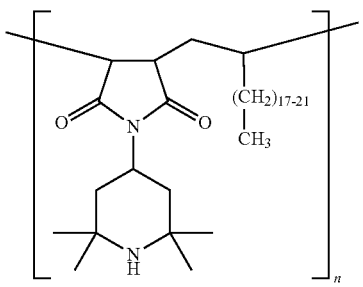

[Chem. 1]

Such compounds having a hindered phenol group or a hindered amine group may be used either individually, or by combining two or more types.

The content of the antioxidant (B) is 0.001 to 5 parts by mass, relative to 100 parts by mass of the EVOH (A). If the content of the antioxidant (B) is less than 0.001 parts by mass, the effect of the present invention might not be achieved. On the other hand, if the content is more than 5 parts by mass, there might be improper dispersion of the antioxidant (B) and due to which the appearance of the molded article and multilayered pipe might deteriorate easily. The content of the antioxidant (B) is preferably between 0.01 and 4 parts by mass, and more preferably between 0.1 and 3 parts by mass relative to 100 parts by mass of the EVOH (A).

(Conjugated Polyene Compound (C))

Conjugated polyene compounds (C) are compounds having so-called conjugated double bonds, which have a structure in which carbon-carbon double bonds and carbon-carbon single bonds are connected alternately, with the number of carbon-carbon double bonds being two or more. A conjugated polyene compound may be a conjugated diene having two carbon-carbon double bonds and one carbon-carbon single bond connected alternately, or a conjugated triene having three carbon-carbon double bonds and two carbon-carbon single bonds connected alternately, or may be a conjugated polyene compound having a greater number of carbon-carbon double bonds and carbon-carbon single bonds connected alternately. Polyene compounds having seven or fewer carbon-carbon double bonds to conjugate are preferred because if the number of carbon-carbon double bonds to conjugate is eight or more, the conjugated polyene compound may color the molded article or the multilayered pipe by its own color. Also, the conjugated polyene compound may contain, in one molecule, a plurality of independent sets of conjugated double bonds consisting of two or more carbon-carbon double bonds, wherein the sets are not conjugated to each other, each. For example, a compound such as wood oil that has three conjugated trienes in one molecule can be included in conjugated polyene compounds (C) of the present invention. Furthermore, in addition to conjugated double bonds, the conjugated polyene compounds may also contain other functional groups such as carboxylic group and its salt, hydroxyl group, ester group, carbonyl group, ether group, amino group, imino group, amide group, cyano group, diazo group, nitro group, sulfone group and its salt, sulfonyl group, sulfoxide group, sulfide group, thiol group, phosphate group and its salt, phenyl group, halogen atom, double bond, and triple bond.

The molecular weight of the conjugated polyene compound (C) must be 1000 or less. If the molecular weight is more than 1000, the dispersion state of the conjugated polyene compound (C) in EVOH worsens, and the appearance of the molded article and multilayered pipe after melt-forming deteriorates. The molecular weight is preferably 500 or less, and more preferably 300 or less.

Specific examples of conjugated polyene compounds (C) include conjugated diene compounds having conjugated structures of two carbon-carbon double bonds such as: isoprene; 2,3-dimethyl-1,3-butadiene; 2,3-diethyl-1,3-butadiene; 2-t-butyl-1,3-butadiene; 1,3-pentadiene; 2,3-dimethyl-1,3-pentadiene; 2,4-dimethyl-1,3-pentadiene; 3,4-dimethyl-1,3-pentadiene; 3-ethyl-1,3-pentadiene; 2-methyl-1,3-pentadiene; 3-methyl-1,3-pentadiene; 4-methyl-1,3-pentadiene; 1,3-hexadiene; 2,4-hexadiene; 2,5-dimethyl-2,4-hexadiene; 1,3-octadiene; 1,3-cyclopentadiene; 1,3-cyclohexadiene; 1-phenyl-1,3-butadiene; 1,4-diphenyl-1,3-butadiene; 1-methoxy-1,3-butadiene; 2-methoxy-1,3-butadiene; 1-ethoxy-1,3-butadiene; 2-ethoxy-1,3-butadiene; 2-nitro-1,3-butadiene; chloroprene; 1-chloro-1,3-butadiene; 1-bromo-1,3-butadiene; 2-bromo-1,3-butadiene; fulvene; tropone; ocimene; phellandrene; myrcene; farnesene; cembrene; sorbic acid; sorbic acid ester; sorbic acid salt; and abietic acid; conjugated triene compounds having conjugated structures of three carbon-carbon double bonds such as: 1,3,5-hexatriene; 2,4,6-octatriene-1-carboxylic acid; eleostearic acid; wood oil; and cholecalciferol; and conjugated polyene compounds having conjugated structures of four or more carbon-carbon double bonds such as: cyclooctatetraene; 2,4,6,8-decatetraene-1-carboxylic acid; retinol; and retinoic acid. Two or more types of polyene compounds can also be used together.

Among these, sorbic acid, sorbic acid ester, sorbic acid salt, and myrcene such as β-myrcene and their mixtures are preferable, and particularly, sorbic acid, sorbic acid salt and their mixtures are widely used industrially as food additives, and preferable from the viewpoint of hygiene and availability, and also suitable because of their effectiveness in preventing oxidative degeneration at high temperatures.

The content of the conjugated polyene compound (C) is 0.00001 to 0.3 parts by mass, relative to 100 parts by mass of the EVOH (A). If the content of the conjugated polyene compound (C) is less than 0.00001 parts by mass, the effect of the present invention is not fully achieved. On the other hand, if the content is more than 0.3 parts by mass, the gelation of the resin composition is accelerated due to which the appearance of the molded article and multilayered pipe might deteriorate easily. The content of the conjugated polyene compound (C) is preferably 0.00005 to 0.2 parts by mass, more preferably 0.0001 to 0.15 parts by mass, and particularly preferably 0.001 to 0.1 parts by mass, relative to 100 parts by mass of the EVOH (A).

(Phosphoric Acid Compound (D))

If a phosphoric acid compound (D) is blended with the resin composition of the present invention, the oxidation degradation of EVOH under high temperatures is prevented, and the occurrence of cracking due to oxidation degradation can be reduced, and therefore, the blending of a phosphoric acid compound is preferable.

The phosphoric acid compound (D) is not particularly restricted, for example, various types of acids such as phosphoric acid and phosphorous acid, and their salts can be used. The phosphate may be included in any form such as primary phosphate, secondary phosphate, and tertiary phosphate. And its cation type is also not particularly restricted, which is preferably an alkali metal salt or alkaline-earth-metal salt. Among these, the phosphoric acid compound is preferably added as phosphoric acid, sodium dihydrogen phosphate, potassium dihydrogen phosphate, disodium hydrogen phosphate, and dipotassium hydrogen phosphate, and is more preferably added as phosphoric acid, sodium dihydrogen phosphate, and potassium dihydrogen phosphate.

The content of the phosphoric acid compound (D) is preferably between 0.0001 and 0.03 parts by mass, in terms of phosphate radical, relative to 100 parts by mass of the EVOH (A). If the content of the phosphoric acid compound (D) is less than 0.0001, the effect of addition of the phosphoric acid compound (D) is not fully achieved. On the other hand, if the content is more than 0.03 parts by mass, it might lead to the formation of gel during melt forming. The content of the phosphoric acid compound (D) is preferably between 0.0003 and 0.025 parts by mass, and more preferably between 0.0005 and 0.02 parts by mass, relative to 100 parts by mass of the EVOH (A).

(Boron Compound (E))

If a boron compound (E) is blended with the resin composition of the present invention, the oxidation degradation of EVOH under high temperatures is prevented, and the occurrence of cracking due to oxidation degradation can be reduced, and therefore, the blending of a boron compound is preferable.

The boron compound (E) is not particularly restricted, and includes for example, boric acids such as orthoboric acid, metaboric acid, and tetraboric acid; boric acid esters such as triethyl borate and trimethyl borate; borates such as alkali metal salt and alkali earth-metal salt of each of the above-mentioned boric acids, and borax; and boron hydrides. Among these compounds, orthoboric acid is preferable.

The content of the boron compound (E) is preferably between 0.002 and 0.2 parts by mass, in terms of boron element, relative to 100 parts by mass of the EVOH (A). If the content of the boron compound (E) is less than 0.002 parts by mass, the effect of addition of the boron compound (E) might not be fully achieved. On the other hand, if the content is more than 0.2 parts by mass, the performance of melt-forming might deteriorate. The content of the boron compound (E) is preferably between 0.005 and 0.1 parts by mass, relative to 100 parts by mass of the EVOH (A).

(Lubricant)

The addition of a lubricant to the resin composition of the present invention is also preferable because it is effective in reducing the occurrence of cracking due to oxidative degeneration. Higher fatty acids, such as lauric acid, myristic acid, palmitic acid, stearic acid, behenic acid, and oleic acid; higher fatty acid metal salts such as aluminum salt, calcium salt, zinc salt, magnesium salt, and barium salt of each of the above higher fatty acids; higher fatty acid esters, such as methyl ester, isopropyl ester, butyl ester, and octyl ester of each of the above higher fatty acids; higher fatty acid amides such as saturated fatty acid amides like stearic acid amide and behenic amide, unsaturated fatty acid amides like oleic acid amide and erucic acid amide, and higher fatty acid amides like ethylene bis stearic acid amide, ethylene bis oleic acid amide, ethylene bis erucic acid amide, and ethylene bis lauric acid amide; low-molecular weight polyolefins such as low molecular weight polyethylene or low molecular weight polypropylene having a number average molecular weight of about 500 to about 10,000, or an acid-modified product thereof; higher alcohols; ester oligomers; and fluoride ethylene resins may be used as the lubricant. And preferably higher fatty acids and/or their metal salts, esters, and amides, and more preferably higher fatty acid metal salts and/or higher fatty acid amides may be used. Two or more types of these lubricants may also be used in combination.

The content of the lubricants is preferably between 0.00001 and 1 part by mass relative to 100 parts by mass of the EVOH (A). If the content of the lubricants is below 0.00001 parts by mass, sufficient effect of prevention of cracking due to oxidation degradation may not be obtained. On the other hand, if the content is more than 1 part by mass, the lubricants are separated at the time of melt-forming the resin composition, and as a result, various abnormalities may arise. The content of the lubricants is preferably between 0.00005 and 0.5 parts by mass relative to 100 parts by mass of EVOH (A).

(Other Additives)

The resin composition of the present invention may also include various additives such as ultraviolet absorbers, plasticizers, antistatic agents, coloring agents, and fillers, and at the same time, other polymer compounds may be blended in proper amount to the extent they do not inhibit the effect of the present invention.

Specific examples of additives are shown below.

Ultraviolet absorbers: Ethylene-2-cyano-3,3'-diphenyl acrylate, 2-(2'-hydroxyl-5'-methylphenyl)benzotriazole, 2-(2'-hydroxyl-3'-t-butyl-5'-methylphenyl)-5-chlorobenzotriazole, 2-hydroxyl-4-methoxybenzophenone-2,2'-dihydroxyl-4-methoxybenzophenone, 2-hydroxyl-4-octoxybenzophenone, and the like.

Plasticizers: Dimethyl phthalate, diethyl phthalate, dioctyl phthalate, wax, liquid paraffin, phosphoric acid esters, and the like.

Antistatic agents: Pentaerythritol monostearate, sorbitan monopalmitate, sulfated polyolefins, polyethylene oxide, carbowax, and the like.

Coloring agents: Titanium oxide, carbon black, phthalocyanine, quinacridone, indolin, azo pigments, colcothar, and the like.

Fillers: Glass fiber, asbestos, balastonite, calcium silicate, and the like.

Furthermore, in order to improve various properties such as thermal stability at the time of melt-forming of the EVOH (A), additives such as organic acids like acetic acid and lactic acid, and inorganic acids other than the phosphoric acid compounds and boron compounds described above, or metal salts of these acids formed with elements of periodic table Groups I, II and III may be added in the pellet of the EVOH (A) within the reasonable extent that does not inhibit the effect of the present invention.

[Method for Producing the Resin Composition]

There are no particular restrictions with respect to methods for uniform blending of the EVOH (A), the antioxidant (B), and the conjugated polyene compound (C) to obtain the resin composition according to the present invention. A method wherein the three constituents, that is, the EVOH (A), the antioxidant (B), and the conjugated polyene compound (C) are dry-blended together and then melt-blended; a method wherein the antioxidant (B) or the conjugated polyene compound (C) is blended in advance in the EVOH (A) to prepare pellets, and the obtained pellets are dry-blended with the remaining components and then melt-blended; and a method wherein the antioxidant (B) and/or the conjugated polyene compound (C) are blended with a part of the EVOH (A) at a high concentration to prepare a granulated master batch, which is dry-blended with the remaining components and then melt-blended can be listed as examples.

Among these, the preferable method is the one wherein the conjugated polyene compound (C) is blended in advance in the EVOH (A) to prepare pellets, and the obtained pellets are dry-blended with the antioxidant (B) and then melt-blended. This method enables uniform blending of each component. Furthermore, the method wherein the conjugated polyene compound (C) is blended in advance in the EVOH (A) to prepare pellets, the antioxidant (B) is blended in the pellets at high concentration to prepare a master batch, and the master batch is dry-blended with the pellets in which the antioxidant (B) is not blended and then melt-blended is also preferable because of improved dispersibility of the antioxidant (B).

In the aforementioned method, in order to obtain the pellet by blending the conjugated polyene compound (C) in the EVOH (A), the EVOH (A) is dissolved in a good solvent such as water/methanol mixed solvent, and a conjugated polyene compound (C) is dissolved in this solution. The mixed solution is extruded into a poor solvent through a nozzle, etc. The deposit is precipitated and/or solidified, then rinsed and/or dried to obtain the pellet. This method is particularly preferable because the dispersibility of the conjugated polyene compound (C) that is not dispersed easily in a uniform manner in the EVOH (A) with a small blending amount is improved.

There are no particular restrictions with respect to the mixing tools for each constituent to obtain the resin composition of the present invention, for example, ribbon blenders, high-speed mixer-cokneaders, mixing rolls, extruders, intensive mixers, or the like, can be listed.

[Molded Article]

The resin composition of the present invention can be molded into desired molded articles such as films, sheets, tubes, bottles, cups, and pipes through publicly known melt extruders, compression molding machines, transfer molding machines, injection molding machines, blow molding machines, heat molding machines, rotary molding machines, dipping molding machines, and the like. The extrusion temperature for molding is generally in the range of 170 to 350° C., although it is suitably selected depending on the type of the resin used, molecular weight, blending ratio of the composition, or the type of molding machine and the like.

A preferable embodiment of the molded article obtained from the resin composition of the present invention is a multilayered structure having at least one layer including the resin composition of the present invention. The layer structure of the multilayered structure is not particularly restricted, and if the layer obtained from the resin composition of the present invention is represented by "E", the layer obtained from an adhesive resin is represented by "Ad", and the layer obtained from a thermoplastic resin is represented by "T", the following layer configurations can be exemplified. A polyolefin modified by an unsaturated carboxylic acid or its derivative is preferably used as the adhesive resin. Furthermore, thermoplastic resins include polyolefins such as polyethylene, polypropylene, poly 1-butene, and poly 4-methyl-1-pentene, and among these, polyethylene, and particularly, high-density polyethylene is preferable.

| 2 layers | Ad/E |
| 3 layers | T/Ad/E, Ad/E/Ad, E/Ad/E |
| 4 layers | T/Ad/E/Ad, Ad/E/Ad/E |
| 5 layers | E/Ad/T/Ad/E, T/Ad/E/Ad/T, Ad/E/Ad/E/Ad, T/Ad/E/Ad/E |
| 6 layers | T/Ad/E/Ad/E/Ad |
| 7 layers | T/Ad/E/Ad/E/Ad/T |

Furthermore, in such a multilayered structure, the thermoplastic resin and/or the adhesive resin can also be substituted by scrap of the multilayered structure. The scrap of other polyolefin molded articles can also be mixed and used.

The method of producing the multilayered structure is not particularly restricted. For example, the method of melt-extruding the thermoplastic resin on the molded article (such as a film or sheet) obtained from the resin composition of the present invention, the method of co-extruding the resin composition of the present invention with another thermoplastic resin, the method of coinjecting the resin composition and the thermoplastic resin of the present invention, or the method of laminating the molded article obtained from the resin composition of the present invention with a film or sheet of another material by using a well-known adhesive such as an organic titanium compound, an isocyanate compound, and a polyester compound, can be used.

[Multilayered Pipe]

The multilayered pipe of the present invention has a layer including the aforementioned resin composition. In the multilayered pipe of the present invention, the aforementioned resin composition is primarily composed of the EVOH (A), which exhibits excellent gas barrier property, and because the oxidation degradation of the EVOH (A) under high temperatures is inhibited, cracking does not occur easily as a result of oxidation degradation in the layer including the aforementioned resin composition (EVOH layer) even when used under high temperatures for long periods of time. By making use of this characteristic, the multilayered pipe of the present invention is preferably used as a hot water circulation pipe and an insulated multilayered pipe for district energy.

The layer configuration of the aforementioned multilayered structure can be adopted as the layer configuration of the multilayered pipe. When the multilayered pipe is used as a hot water circulation pipe, the three-layer configuration of T/Ad/E in which the layer including the aforementioned resin composition is the outermost layer is generally adopted. This is because in reality many pipe manufacturers are making use of this configuration since by adding equipment for co-extrusion coating of the resin composition of the present invention and the adhesive resin to the manufacturing line of single-layer pipes, such as the existing cross-linked polyolefins, the manufacturing line can be easily converted to the manufacturing line for the multilayered pipe of the present invention.

By providing a polyolefin layer or the like on both sides of the layer including the resin composition of the present invention, and using the resin composition layer as the intermediate layer, scratching of the resin composition layer can be prevented effectively. However, when the multilayered pipe is used as a hot water circulation pipe, such as a floor heating pipe, the risk of the layer including the resin composition of the present invention getting scratched or damaged due to physical impact is relatively small because the pipe is normally embedded under the floor. In fact, from the viewpoint of the gas barrier property, the arrangement of the resin composition layer as the outermost layer is desired.

The gas barrier property of the EVOH (A) shows a large humidity dependence, and because the barrier properties decline under high-humidity conditions, if the layer including the resin composition of the present invention is arranged as the outermost layer, the layer including the resin composition of the present invention composed primarily of the EVOH (A) is positioned at the farthest location from the inner surface of the pipe that is in contact with water, which makes it the most advantageous layer configuration from the viewpoint of the barrier performance of the multilayered pipe. On the other hand, when the EVOH layer is arranged as the outermost layer, this layer comes in direct contact with the air, and generally oxidation degradation of the EVOH layer easily occurs. Under such environmental conditions, by arranging the layer including the resin composition of the present invention, which is not easily affected by oxidation degradation even under high temperatures, as the outermost layer, the effect of the present invention of providing a multilayered pipe which has improved barrier properties and can reduce occurrence of cracking due to oxidation degradation, is exhibited effectively.

Furthermore, when the multilayered pipe of the present invention is used as an insulated multilayered pipe for district energy, etc., the three-layer configuration of T/Ad/E (hereinafter, may be abbreviated as laminate 1) in which the layer including the aforementioned resin composition is arranged inwards from the thermoplastic resin layer, or the five-layer configuration of T/Ad/E/Ad/T (hereinafter, may be abbreviated as laminate 2) configured from the viewpoint of preventing scratching of the resin composition layer are preferable.

The configuration of the insulated multilayered pipe for district energy, etc. is not particularly restricted, for example, the pipe is preferably arranged in the order of an inner pipe, an insulation foam layer covering the surrounding of the inner pipe, and the aforementioned laminate 1 or 2 having a layer including the resin composition of the present invention as the outer layer, from the inner side.

The type (material), shape, and size of the pipe used as the inner pipe is not particularly restricted as long as a heat carrier such as gas and liquid can be transferred, and they can be selected appropriately depending on the type of the heat carrier, and the purpose and form of usage of the pipe. Specifically, metals such as steel, stainless, and aluminum; polyolefins (such as polyethylene, crosslinked polyethylene (PEX), polypropylene, poly 1-butene, and poly 4-methyl-1-pentene), and the aforementioned laminate 1 or 2 having a layer including the resin composition of the present invention can be listed as examples, and among these, crosslinked polyethylene (PEX) is preferably used.

Polyurethane foam, polyethylene foam, polystyrene foam, phenol foam, and polyisocyanurate foam can be used as the insulation foam, and from the viewpoint of improvement in the insulation performance, polyurethane foam is preferably used.

Freon gas, various freon gas alternatives, water, chlorinated hydrocarbons, hydrocarbons, and carbon dioxide can be used as the blowing agent of insulation foam, but from the viewpoint of the foaming effect and the impact on the environment, hydrocarbons, particularly, n-pentane and cyclopentane are preferably used.

The methods for producing the insulated multilayered pipe include, for example, inserting the inner pipe used to transfer the heat carrier inside the pipe-shaped outer layer, fixing the inner pipe with a spacer to form a double pipe, and then pouring various foam feedstocks in the space between the inner pipe and the outer layer to result in foam and hardening. The material of the aforementioned spacer is not particularly restricted, however in order to reduce the damage caused to the inner pipe and the outer layer by the spacer, polyethylene or polyurethane is desired.

[Method for Producing the Molded Article and Multilayered Pipe]

The method for producing the multilayered pipe is explained below, but a part or all of the producing method can also be applied to other molded articles (such as films and sheets).

The multilayered pipe of the present invention can be produced by performing co-extrusion coating of the resin composition of the present invention and the adhesive resin on a single-layer pipe such as the crosslinked polyolefin as above described. When performing co-extrusion coating of the resin composition of the present invention and the adhesive resin on the single-layer pipe, a film of melted resin composition of the present invention and adhesive resin can simply be coated on the single-layer pipe, however, the adhesive power between the pipe and the coating may be insufficient, which could cause the coating to tear when used for a long period of time, resulting in loss of the gas barrier property. As a measure, performing flame treatment and/or corona discharge treatment on the surface of the pipe to be coated, before the coating process, can prove to be effective.

Another method of multilayer formation for producing a multilayered pipe includes the so-called co-extrusion molding method. In this method, a number of extruders corresponding to the number of types of resin layers are used, and resins melted in each extruder are simultaneously extruded to form a laminated layer structure. Another method of multilayer formation, such as dry lamination, can also be applied.

The method for producing the multilayered pipe preferably includes a step of cooling immediately after molding, by using water having a temperature of 10 to 70° C. That is, it is desired that after melt-forming, the resin composition layer of the present invention is solidified by cooling using water having a temperature of 10 to 70° C. before the solidification of the resin composition layer. If the temperature of the cooling water is too low, then in the succeeding secondary processing process wherein the multilayered pipe is bent, cracking occurs easily due to distortion in the layer including the resin composition of the present invention at the bent part. Although the details of the cause of the occurrence of cracking due to distortion are not clear, the residual stress in the molded article is expected to play a role. From this viewpoint, the temperature of the cooling water is preferably 15° C. or more, and more preferably 20° C. or more. On the other hand, even if the temperature of the cooling water is too high, then during the secondary processing process, cracking occurs easily due to distortion in the layer including the resin composition of the present invention in the bent part. The details of the cause are again not very clear, but this could possibly be due to too high a degree of crystallization of the layer including the resin composition of the present invention. From this viewpoint, the temperature of the cooling water is preferably 60° C. or less, and more preferably 50° C. or less.

By performing secondary processing of the multilayered pipe obtained by the aforementioned method, various molded articles can be obtained. The method of secondary processing is not particularly restricted, and an appropriate well-known method of secondary processing can be selected. For example, a method containing heating the multilayered pipe at 80 to 160° C. and changing it in to the desired shape, and then fixing the shape of the pipe for one minute to two hours to solidify, may be applied.

EXAMPLES

Next, the present invention will be explained in greater detail through examples, however, the present invention is not limited to these examples. In the following producing example, the content of each constituent was quantitatively determined by the below method.
(1) Conjugated Polyene Compound Dried EVOH pellets were frozen and crushed, and sifted through a 100-mesh sieve to eliminate coarse particles. A 10 g portion of the powder obtained was submitted to Soxhlet extraction for 48 hours with 100 ml of chloroform. The amount of conjugated polyene compound in the extraction liquid was determined by quantitative analysis through high performance liquid chromatography. The quantitative determination was made using calibration curves prepared with the reference standard of each conjugated polyene compound.
(2) Phosphoric Acid Compound and Boron Compound Dried EVOH pellets were crushed by freezing and crushing. In 0.5 g portion of the powder obtained, 5 ml of nitric acid was added, and then wet degradation was performed using "Speedwave MWS-2" manufactured by BERGHOF. The liquid obtained after wet degradation was diluted with ion-exchanged water to obtain a total solution of 50 ml. Quantitative determination of elemental phosphorus and boron element in the diluted solution was performed using an ICP emission spectrochemical analysis device "Optima 4300 DV" manufactured by PerkinElmer Japan Co., Ltd. The amount of the phosphoric acid compound was calculated as a value in terms of phosphate radical, and the amount of the boron compound was calculated as a value in terms of boron element. An analytical curve prepared from commercially-available standard solution was used for the quantitative determination of both compounds.

Producing Example 1

Produce of EVOH Pellets (1)

2 kg of EVOH resin having an ethylene unit content of 32 mol %, having a degree of saponification of 99.8 mol %, and limiting viscosity[η]ph of 0.112 L/g as measured by using a liquid mixture of water/phenol=15/85 (mass ratio) as a solvent, was added to 18 kg of a mixed solvent of water/methanol=40/60 (mass ratio) and completely dissolved by stirring for six hours at 60° C. To this solution, 1 g of sorbic acid (0.05 parts by mass relative to 100 parts by mass of EVOH) was added as a conjugated polyene compound and completely dissolved by stirring for one additional hour to obtain an EVOH solution containing sorbic acid. This solution was continuously extruded into a coagulation bath of water/methanol=90/10 (mass ratio) with temperature adjusted to 0° C. through a nozzle of 4 mm diameter to coagulate EVOH in a strand shape. This strand was then introduced into a pelletizer to obtain porous EVOH chips.

The porous EVOH chips thus obtained were rinsed with an acetic acid aqueous solution and ion-exchanged water followed by immersion in an aqueous solution containing acetic acid, potassium dihydrogen phosphate, and sodium acetate. EVOH chips were isolated from the aqueous solution used for processing, dewatered, and then, dried for 4 hours in a hot-air drier at 80° C., followed by drying for 16 hours at 100° C. to obtain dried EVOH pellets (1). The content of the phosphorous compound in the EVOH pellets (1) was 100 ppm, in terms of phosphate radical. The melt index (ASTM-D1238, measured at 190° C., under a load of 2160 g) of the EVOH pellets (1) was 1.6 g/10 minutes.

Producing Example 2

Produce of EVOH Pellets (2)

EVOH pellets (2) were obtained in the same manner as in Producing Example 1 except for the use of a blending amount of 0.01 g of sorbic acid (0.0005 parts by mass relative to 100 parts by mass of EVOH). The content of the phosphorous compound in the EVOH pellets (2) was 100 ppm, in terms of phosphate radical, and the melt index (ASTM-D1238, measured at 190° C., under a load of 2160 g) was 1.6 g/10 minutes.

Producing Example 3

Produce of EVOH Pellets (3)

EVOH pellets (3) were obtained in the same manner as in Producing Example 1 except for the use of a blending amount of 0.2 g of sorbic acid (0.01 parts by mass relative to 100 parts by mass of EVOH). The content of the phosphorous compound of the EVOH pellets (3) was 100 ppm, in terms of phosphate radical, and the melt index (ASTM-D1238, measured at 190° C., under a load of 2160 g) was 1.6 g/10 minutes.

Producing Example 4

Produce of EVOH Pellets (4)

EVOH pellets (4) were obtained in the same manner as in Producing Example 1 except for the use of β-myrcene as the conjugated polyene compound instead of the sorbic acid in the Producing Example 1. The content of the phosphorous compound in the EVOH pellets (4) was 100 ppm, in terms of phosphate radical, and the melt index (ASTM-D1238, measured at 190° C., under a load of 2160 g) was 1.6 g/10 minutes.

Producing Example 5

Produce of EVOH Pellets (5)

EVOH pellets (5) were obtained in the same manner as in Producing Example 1 except for the use of potassium sorbate as the conjugated polyene compound instead of the sorbic acid in the Producing Example 1. The content of the phosphorous compound in the EVOH pellets (5) was 100 ppm, in terms of phosphate radical, and the melt index (ASTM-D1238, measured at 190° C., under a load of 2160 g) was 1.6 g/10 minutes.

Producing Example 6

Produce of EVOH Pellets (6)

Porous EVOH chips were obtained in the same manner as in Producing Example 1 except that EVOH resin having an ethylene unit content of 32 mol %, having a degree of saponification of 99.8 mol %, and limiting viscosity[η]ph of 0.092 L/g as measured by using a liquid mixture of water/phenol=15/85 (mass ratio) as a solvent, was used as the EVOH resin. The porous EVOH chips thus obtained were rinsed with an acetic acid aqueous solution and ion-exchanged water followed by immersion in an aqueous solution containing acetic acid, potassium dihydrogen phosphate, sodium acetate, and boric acid. EVOH chips were isolated from the aqueous solution used for processing, dewatered, and then, dried for 4 hours in a hot-air drier at 80° C., followed by drying for 16 hours at 100° C. to obtain dried EVOH pellets (6). The content of the phosphorous compound in the EVOH pellets (6) was 100 ppm, in terms of phosphate radical, and the content of the boron compound was 170 ppm in terms of boron element. The melt index (ASTM-D1238, measured at 190° C., under a load of 2160 g) was 1.6 g/10 minutes.

Producing Example 7

Produce of EVOH Pellets (7)

EVOH pellets (7) were obtained in the same manner as in Producing Example 1 except that potassium dihydrogen phosphate was not added to the aqueous solution used for immersion, when immersing the EVOH chips. The content of the phosphorous compound in the EVOH pellets (7) was 0 ppm and the melt index (ASTM-D1238, measured at 190° C., under a load of 2160 g) was 1.6 g/10 minutes.

Producing Example 8

Produce of EVOH Pellets (8)

EVOH pellets (8) were obtained in the same manner as in Producing Example 1 except for the use of a blending amount of 6 g of sorbic acid (0.3 parts by mass relative to 100 parts by mass of EVOH). The content of the phosphorous compound in the EVOH pellets (8) was 100 ppm, in terms of phosphate radical, and the melt index (ASTM-D1238, measured at 190° C., under a load of 2160 g) was 1.6 g/10 minutes.

Producing Example 9

Produce of EVOH Pellets (9)

EVOH pellets (9) were obtained in the same manner as in Producing Example 1 except for the use of a blending amount of 0.0002 g of sorbic acid (0.00001 parts by mass relative to 100 parts by mass of EVOH). The content of the phosphorous compound in the EVOH pellets (9) was 100 ppm, in terms of phosphate radical, and the melt index (ASTM-D1238, measured at 190° C., under a load of 2160 g) was 1.6 g/10 minutes.

Producing Example 10

Produce of EVOH Pellets (10)

EVOH pellets (10) were obtained in the same manner as in Producing Example 1 except for the use of a blending amount of 0.001 g of sorbic acid (0.00005 parts by mass relative to 100 parts by mass of EVOH). The content of the phosphorous compound in the EVOH pellets (10) was 100 ppm, in terms of phosphate radical, and the melt index (ASTM-D1238, measured at 190° C., under a load of 2160 g) was 1.6 g/10 minutes.

Producing Example 11

Produce of EVOH Pellets (11)

EVOH pellets (11) were obtained in the same manner as in Producing Example 1 except for the use of a blending amount of 0.002 g of sorbic acid (0.0001 parts by mass relative to 100 parts by mass of EVOH). The content of the phosphorous compound in the EVOH pellets (11) was 100 ppm, in terms of phosphate radical, and the melt index (ASTM-D1238, measured at 190° C., under a load of 2160 g) was 1.6 g/10 minutes.

Producing Example 12

Produce of EVOH Pellets (12)

EVOH pellets (12) were obtained in the same manner as in Producing Example 1 except for the use of a blending amount of 2 g of sorbic acid (0.1 parts by mass relative to 100 parts by mass of EVOH). The content of the phosphorous compound in the EVOH pellets (12) was 100 ppm, in terms of phosphate radical, and the melt index (ASTM-D1238, measured at 190° C., under a load of 2160 g) was 1.6 g/10 minutes.

Producing Example 13

Produce of EVOH Pellets (13)

EVOH pellets (13) were obtained in the same manner as in Producing Example 1 except for the use of a blending amount of 0.02 g of sorbic acid (0.001 parts by mass relative to 100 parts by mass of EVOH). The content of the phosphorous compound in the EVOH pellets (13) was 100 ppm, in terms of phosphate radical, and the melt index (ASTM-D1238, measured at 190° C., under a load of 2160 g) was 1.6 g/10 minutes.

Producing Example 14

Produce of EVOH Pellets (14)

EVOH pellets (14) were obtained in the same manner as in Producing Example 1 except that the conjugated polyene compound was not blended. The content of the phosphorous compound in the EVOH pellets (14) was 100 ppm, in terms of phosphate radical, and the melt index (ASTM-D1238, measured at 190° C., under a load of 2160 g) was 1.6 g/10 minutes.

Producing Example 15

Produce of EVOH Pellets (15)

EVOH pellets (15) were obtained in the same manner as in Producing Example 1 except for the use of a blending amount of 10 g of sorbic acid (0.5 parts by mass relative to 100 parts by mass of EVOH). The content of the phosphorous compound in the EVOH pellets (15) was 100 ppm, in terms of phosphate radical, and the melt index (ASTM-D1238, measured at 190° C., under a load of 2160 g) was 1.6 g/10 minutes.

Example 1

0.5 parts by mass of N,N'-hexane-1,6-diylbis[3-(3,5-di-tert-butyl-4-hydroxyphenyl)propionamide] was dry-blended into the EVOH pellets (1), as the antioxidant, relative to 100 parts by mass of EVOH and the resulting mixture was pelletized after blending at an extrusion temperature of 200° C. by using a twin screw co-rotating extruder of 30 mm φ(TEX-30N, manufactured by Japan Steel Works, Ltd.) to obtain resin composition pellets.

The resin composition pellets thus obtained were used to produce a single-layer film under the below-mentioned conditions by using an extruder having a diameter of 20 mm ("D2020" manufactured by Toyo Seiki Seisaku-Sho, Ltd.", D (mm)=20, L/D=20, compression ratio=2.0, screw: full flight).

Extrusion temperature: Supply unit/Compression unit/Metering unit/Die=175/210/220/220° C.
Screw rotation speed: 90 rpm
Output rate: 2.1 kg/hr
Take-up roll temperature: 80° C.
Take-up roll speed: 0.9 m/minute
Film thickness: 100 μm Examples 2 to 19

Comparative Examples 1 to 5

Pellets of the resin composition according to these examples and comparative examples, as well as a single-layer film formed therewith was obtained in the same manner as in Example 1 except that the types of EVOH pellets and antioxidants, and the blending amount of the antioxidant described in Table 1 were used.

(Method of Evaluating the Single-Layer Film)

The single-layer film obtained in Examples 1 to 19 and Comparative Examples 1 to 5 was evaluated by the following method. The evaluation results are shown in Table 1 along with the type and ratio of each constituent.

(1) Resistance to Oxidative Degeneration

The aging variation of the tensile strength of the single-layer film thus obtained was evaluated by measuring a plurality of samples with different heat treatment periods under the below evaluation conditions. The time period when the elongation at break becomes ¼ of the sample in which heat treatment is not performed was found out and set as the index of resistance to oxidative degeneration.

Evaluation Conditions:

Heat treatment: Extracted after performing heat treatment for a predetermined time period inside a hot-air drier set at 140° C.

Humidification conditions: Immersed for five days in water having a temperature of 20° C., wiped off the surface water, and kept aside for two weeks in a room with 20° C. and 65% RH.

Measurement of tensile strength: Sample width 15 mm, Chuck interval 30 mm, Tension speed 50 mm/minute, measurement atmosphere 20° C. to 65% RH In the above evaluation, because the deterioration in the gas barrier property of the EVOH layer as a result of occurrence of cracking due to oxidative degeneration becomes remarkable when the elongation at break becomes ¼ or less, this time period until when the elongation at break becomes ¼ can be assumed as one of the indexes of lifespan based on the oxidative degeneration of EVOH under high temperatures. The time period until when the elongation at break becomes ¼ shows an Arrhenius type temperature dependence, and if the time period (lifespan) until when the elongation at break becomes ¼ at 80° C. is assumed as 100 years or more, the time period until when the elongation at break becomes ¼ at 140° C. must be set as 210 hours or more.

(2) Appearance

The existence of flowing spots, streaks, and fish eye in the single-layer film thus obtained was checked visually. The appearance of the single-layer film was judged based on the following standards:

A: There are no flowing spots and streaks, and fish eyes either do not exist or exist in very small number.

B: There are a few flowing spots and streaks, and fish eyes exist in a small number.

C: Flowing spots and streaks are remarkably present, and there are a large number of fish eyes.

TABLE 1

| | Types of EVOH pellets | (B) Antioxidant Types*[1] | Blending amount*[2] (Part by mass) | (C) Conjugated polyene compound Types | Blending amount*[2] (ppm) | (D) Phosphoric acid compound Blending amount*[3] (ppm) | (E) Boron compound Blending amount*[4] (ppm) | Resistance to oxidative degeneration (hr) | Appearance |
|---|---|---|---|---|---|---|---|---|---|
| Example 1 | EVOH pellet (1) | antioxidant (1) | 0.5 | sorbic acid | 500 | 100 | 0 | 276 | A |
| Example 2 | EVOH pellet (2) | antioxidant (1) | 0.5 | sorbic acid | 5 | 100 | 0 | 230 | A |
| Example 3 | EVOH pellet (3) | antioxidant (1) | 0.5 | sorbic acid | 100 | 100 | 0 | 245 | A |
| Example 4 | EVOH pellet (1) | antioxidant (2) | 0.2 | sorbic acid | 500 | 100 | 0 | 248 | A |
| Example 5 | EVOH pellet (4) | antioxidant (1) | 0.5 | β-myrcene | 500 | 100 | 0 | 251 | A |
| Example 6 | EVOH pellet (5) | antioxidant (1) | 0.5 | potassium sorbate | 500 | 100 | 0 | 260 | A |
| Example 7 | EVOH pellet (6) | antioxidant (1) | 0.5 | sorbic acid | 500 | 100 | 170 | 302 | A |
| Example 8 | EVOH pellet (7) | antioxidant (1) | 0.5 | sorbic acid | 500 | 0 | 0 | 239 | A |
| Example 9 | EVOH pellet (1) | antioxidant (1) | 5 | sorbic acid | 500 | 100 | 0 | 304 | B |
| Example 10 | EVOH pellet (1) | antioxidant (1) | 0.001 | sorbic acid | 500 | 100 | 0 | 213 | A |
| Example 11 | EVOH pellet (1) | antioxidant (1) | 0.01 | sorbic acid | 500 | 100 | 0 | 228 | A |
| Example 12 | EVOH pellet (1) | antioxidant (1) | 3 | sorbic acid | 500 | 100 | 0 | 281 | A |
| Example 13 | EVOH pellet (1) | antioxidant (1) | 0.1 | sorbic acid | 500 | 100 | 0 | 239 | A |
| Example 14 | EVOH pellet (8) | antioxidant (1) | 0.5 | sorbic acid | 3000 | 100 | 0 | 312 | B |
| Example 15 | EVOH pellet (9) | antioxidant (1) | 0.5 | sorbic acid | 0.1 | 100 | 0 | 210 | A |
| Example 16 | EVOH pellet (10) | antioxidant (1) | 0.5 | sorbic acid | 0.5 | 100 | 0 | 215 | A |
| Example 17 | EVOH pellet (11) | antioxidant (1) | 0.5 | sorbic acid | 1 | 100 | 0 | 223 | A |
| Example 18 | EVOH pellet (12) | antioxidant (1) | 0.5 | sorbic acid | 1000 | 100 | 0 | 284 | A |
| Example 19 | EVOH pellet (13) | antioxidant (1) | 0.5 | sorbic acid | 10 | 100 | 0 | 241 | A |

TABLE 1-continued

| | Types of EVOH pellets | (B) Antioxidant Types*[1] | Blending amount*[2] (Part by mass) | (C) Conjugated polyene compound Types | Blending amount*[2] (ppm) | (D) Phosphoric acid compound Blending amount*[3] (ppm) | (E) Boron compound Blending amount*[4] (ppm) | Resistance to oxidative degeneration (hr) | Appearance |
|---|---|---|---|---|---|---|---|---|---|
| Comparative Example 1 | EVOH pellet (14) | NA | 0 | NA | 0 | 100 | 0 | 74 | A |
| Comparative Example 2 | EVOH pellet (14) | antioxidant (1) | 0.5 | NA | 0 | 100 | 0 | 199 | A |
| Comparative Example 3 | EVOH pellet (1) | NA | 0 | sorbic acid | 500 | 100 | 0 | 89 | A |
| Comparative Example 4 | EVOH pellet (1) | antioxidant (1) | 10 | sorbic acid | 500 | 100 | 0 | —*[5] | —*[6] |
| Comparative Example 5 | EVOH pellet (15) | antioxidant (1) | 0.5 | sorbic acid | 5000 | 100 | 0 | —*[5] | C |

*[1]Antioxidant (1) . . . N,N'-hexane-1,6-diylbis [3-(3,5-di-tert-butyl-4-hydroxyphenyl) propionamide] Antioxidant (2) . . . N,N'-1,6-hexanediylbis [N-(2,2,6,6-tetramethyl-4-piperidinyl) formamide]
*[2]Blending amount relative to 100 parts by mass of EVOH
*[3]Value in terms of phosphate radical
*[4]Value in terms of boron element
*[5]Not measured
*[6]Impossible to form film Example 20

100 parts by mass of a high-density polyethylene ("Yukaron Hard BX-50" manufactured by Mitsubishi Chemical Corporation having a density of 0.952 g/cc and an MFR of 0.5 g/10 minutes), 2 parts by mass of vinyl trimethoxy silane dissolved in acetone, and 0.2 parts by mass of dicumyl peroxide were mixed. This mixture was extruded in the form of a strand with a single screw extruder at 230° C., and pellets of modified polyethylene containing 1.5% by mass of vinyl silane were obtained. Then, 5 parts by mass of the high-density polyethylene blended with 2% by mass of dibutyltin dilaurate, relative to 100 parts by mass of these pellets, were blended and fed into a first extruder, and the pellets of the resin composition obtained above in the same way as Example 1 were fed into a second extruder, and an adhesive resin ("Admer-NF408E" manufactured by Mitsui Chemicals, Inc.) was fed into a third extruder. Then, a multilayered pipe having an outer diameter of 20 mm was extrusion-molded with a three-material, three-layered circular die, and was then immediately cooled and solidified using a cooling water bath with temperature adjusted to 40° C. The layer configuration of the multilayered pipe included the resin composition layer as the outermost layer, with the resin composition layer/adhesive resin layer/high-density polyethylene layer=100 µm/100 µm/2000 µm. The pipe thus obtained was inserted in a hot-air drier with a temperature of 140° C., and heat treatment was performed for 216 hours. The rate of increase of dissolved oxygen was measured by the below-mentioned method using the multilayered pipe following heat treatment, and the rate of increase of dissolved oxygen was measured to be 24 µg/L·hr.

(Method of Measuring the Rate of Increase of Dissolved Oxygen)

Water from which dissolved oxygen had been removed by use of a packed tower packed with metal tin was obtained. This water was circulated in the obtained multilayered pipe at 70° C. The rate of increase of dissolved oxygen in the circulating water was measured under an atmosphere of 20° C. and 65% RH. Herein, the rate of increase (µg/L·hr) means the rate of increase (µg/hr) of dissolved oxygen per liter of water circulating in the pipe. In other words, when the entire volume of water in the equipment system including the pipe is V (cc), the volume of water in the pipe is v (cc), and the increased amount of the dissolved oxygen concentration in the water circulating in the system per unit time is B µg/L·hr, then the rate of increase of dissolved oxygen (A µg/L·hr) is $A = B \times (V/v)$.

Comparative Example 6

A three-material, three-layered, multilayered pipe was obtained in the same manner as Example 20 except for the use of EVOH pellets (14) instead of pellets of the resin composition. The pipe thus obtained was inserted in a hot-air drier with a temperature of 140° C., and heat treatment was performed for 216 hours. The rate of increase of dissolved oxygen was measured by the above method using the multilayered pipe after heat treatment, and the rate of increase of dissolved oxygen was measured to be 90 µg/L·hr.

Example 21

100 parts by mass of a high-density polyethylene ("Yukaron Hard BX-50" manufactured by Mitsubishi Petrochemical Co., Ltd. having a density of 0.952 g/cc and an MFR of 0.5 g/10 minutes), 2 parts by mass of vinyl trimethoxy silane and 0.2 parts by mass of dicumyl peroxide dissolved in acetone were mixed. This mixture was extruded in the form of a strand with a single screw extruder at 230° C., and pellets of modified polyethylene containing 1.5% by mass of vinyl silane were obtained. Then, 5 parts by mass of the high-density polyethylene blended with 2% by mass of dibutyltin dilaurate, relative to 100 parts by mass of these pellets, were blended and fed into a first extruder, and the pellets of the resin composition obtained above in the same way as Example 1 were fed into a second extruder, and an adhesive resin ("Admer-NF408E" manufactured by Mitsui Chemicals, Inc.) was fed into a third extruder. Then, a multilayered pipe having an outer diameter of 20 mm was extrusion-molded with a three-material, three-layered circular die, and was then immediately cooled and solidified using a cooling water bath with temperature adjusted to 40° C.

The layer configuration of the multilayered pipe included the resin composition layer as the outermost layer, with the resin composition layer/adhesive resin layer/high-density polyethylene layer=100 µm/100 µm/2000 µm. The multilayered pipe thus obtained was inserted in a hot-air drier with a temperature of 140° C., and heat treatment was performed for 10 minutes. Following this, the bending process was performed by bending the pipe by 90° along a stainless steel pipe with an outer diameter of 150 mm, and then fixing it for five minutes. When the surface of the resin composition layer of the bent portion was observed, cracking due to distortion during the bending process was not seen. The rate of increase of dissolved oxygen was measured by the above method for the multilayered pipe following the bending process, and the rate of increase of dissolved oxygen was measured to be 24 μg/L·hr.

Reference Example 1

A multilayered pipe was obtained in the same manner as in Example 21 except that the temperature of the cooling water bath through which the multilayered pipe passes immediately after extrusion-molding was changed to 5° C. The bending process was performed in the same manner as in Example 21 for the multilayered pipe thus obtained, and when the surface of the resin composition layer of the bent portion was observed, very few minute cracks were seen due to distortion during the bending process. The rate of increase of dissolved oxygen was measured by the above method for the multilayered pipe following the bending process, and the rate of increase of dissolved oxygen was measured to be 32 μg/L·hr.

Reference Example 2

A multilayered pipe was obtained in the same manner as in Example 21 except that the temperature of the cooling water bath through which the multilayered pipe passes immediately after extrusion-molding was changed to 85° C. The bending process was performed in the same manner as in Example 21 for the multilayered pipe thus obtained, and when the surface of the resin composition layer of the bent portion was observed, very few minute cracks were seen due to distortion during the bending process. The rate of increase of dissolved oxygen was measured by the above method for the multilayered pipe following the bending process, and the rate of increase of dissolved oxygen was measured to be 36 μg/L·hr.

Comparative Example 7

A three-material, three-layered, multilayered pipe was obtained in the same manner as Example 21 except for the use of EVOH pellets (14) instead of pellets of the resin composition. The bending process was performed in the same manner as in Example 21 for the multilayered pipe thus obtained, and when the surface of the resin composition layer of the bent portion was observed, several minute cracks were seen due to distortion during the bending process. The rate of increase of dissolved oxygen was measured by the above method for the multilayered pipe following the bending process, and the rate of increase of dissolved oxygen was measured to be 76 μg/L·hr.

Example 22

The aforementioned high-density polyethylene was fed into a first extruder, the pellets of the resin composition obtained above in the same way as Example 1 were fed into a second extruder, and an adhesive resin ("Admer-NF408E" manufactured by Mitsui Chemicals, Inc.) was fed into a third extruder. Then, an outer-layer pipe having an outer diameter of 77 mm was extrusion-molded with a three-material, three-layered circular die, and was then immediately cooled and solidified using a cooling water bath with temperature adjusted to 40° C.

The layer configuration of the outer-layer pipe included the resin composition layer as the innermost layer, with the resin composition layer/adhesive resin layer/high-density polyethylene layer=100 μm/100 μm/2000 μm.

A steel pipe with an outer diameter of 20 mm was inserted inside the outer-layer pipe as the inner pipe, and fixed with a spacer. In the space between the outer-layer pipe and the inner pipe, a mixture of 130 parts by mass of a polyol composition and 115 parts by mass of polymethylene polyphenyl polyisocyanate (Crude MDI) (Millionate MR-200 manufactured by Nippon Polyurethane Industry Co. Ltd.) was filled. Here, the polyol composition was prepared by mixing 3 parts by mass of a silicone foaming stabilizer ("SF2937" manufactured by Dow Corning Toray Co., Ltd.), 11 parts by mass of cyclopentane as the blowing agent, 1 part by mass of triethylene diamine as an amine urethane catalyst, 8 parts by mass of 1,2-butylene oxide, 0.3 parts by mass of zinc chloride as a carbon dioxide fixation catalyst and 5.7 parts by mass of tetrabutylammonium bromide in 100 parts by mass of a polyol (SPINODOL RD-4011P manufactured by DIC Corporation). Next, after heating the mixture for 10 minutes at 45° C. and then hardening, foamed polyurethane was formed by keeping for 24 hours under room temperature, and a multilayered pipe for district energy composed of an inner pipe, an insulation foam layer covering the surrounding of the inner pipe, and an outer-layer pipe was prepared. After performing heat treatment of the multilayered pipe thus obtained for 150 days at 90° C., a weight of 3.0 kg having a hemispherical tip with a diameter of 25 mm was dropped from a height of 2 m under −20° C. for the impact resistance test according to ISO3127:1994, and the occurrence of cracking was not observed.

Comparative Example 8

A three-material, three-layered outer-layer pipe was obtained in the same manner as Example 22 except for the use of EVOH pellets (14) instead of pellets of the resin composition, and a multilayered pipe for district energy composed of an inner pipe, an insulation foam covering the surrounding of the inner pipe, and an outer-layer pipe was prepared. After performing heat treatment of the multilayered pipe thus obtained for 150 days at 90° C., a weight of 3.0 kg having a hemispherical tip with a diameter of 25 mm was dropped from a height of 2 m under −20° C. for impact resistance test according to ISO3127:1994, and the progression of cracks was observed.

INDUSTRIAL APPLICABILITY

The multilayered pipe having a layer comprising the resin composition of the present invention has excellent gas barrier property, and inhibits the oxidative degeneration of EVOH in the resin composition. Therefore, even after use under high temperatures for a long period of time, cracking in the resin composition layer (EVOH layer) does not occur easily as a result of oxidative degeneration. By making use of such characteristics, the multilayered pipe of the present invention is preferably used as a hot water circulation pipe and an insulated multilayered pipe.

The invention claimed is:

1. An insulated multilayered pipe, comprising an insulation foam layer and a layer comprising a resin composition comprising an ethylene-vinyl alcohol copolymer (A) and, relative to 100 parts by mass of the ethylene-vinyl alcohol copolymer (A), 0.001 to 5 parts by mass of an antioxidant (B), and 0.00001 to 0.3 parts by mass of a conjugated polyene compound (C) having a molecular weight of 1000 or less.

2. The insulated multilayered pipe according to claim 1, wherein the resin composition comprises 0.00005 to 0.2 parts by mass of the conjugated polyene compound (C).

3. The insulated multilayered pipe according to claim 2, wherein the resin composition comprises 0.0001 to 0.15 parts by mass of the conjugated polyene compound (C).

4. The insulated multilayered pipe according to claim 1, wherein the conjugated polyene compound (C) has a molecular weight of 500 or less.

5. The insulated multilayered pipe according to claim 1, wherein the conjugated polyene compound (C) has seven or fewer carbon-carbon double bonds to conjugate.

6. The insulated multilayered pipe according to claim 5, wherein the conjugated polyene compound (C) is at least one selected from a group consisting of sorbic acid, sorbic acid salt, and myrcene.

7. The insulated multilayered pipe according to claim 6, wherein the conjugated polyene compound (C) is sorbic acid, a salt thereof, or both.

8. The insulated multilayered pipe according to claim 1, wherein the resin composition comprises 0.01 to 4 parts by mass of the antioxidant (B).

9. The insulated multilayered pipe according to claim 1, wherein the antioxidant (B) is a compound comprising a hindered amine group, a compound comprising a hindered phenol group, or both.

10. The insulated multilayered pipe according to claim 1, wherein the conjugated polyene compound (C) is sorbic acid salt, a salt thereof, or both, and the antioxidant (B) is a compound comprising a hindered amine group, a compound comprising a hindered phenol group, or both.

11. The insulated multilayered pipe according to claim 10, comprising 0.0001 to 0.15 parts by mass of the conjugated polyene compound (C) and 0.01 to 4 parts by mass of the antioxidant (B).

12. An insulated multilayered pipe according to claim 1, comprising an inner pipe, an insulation foam layer, and the layer comprising the resin composition in a sequence from an inner side.

13. An insulated multilayered pipe according to claim 1, comprising an inner pipe, an insulation foam layer covering the surrounding of the inner pipe, and an outer-layer pipe, in a sequence from an inner side, wherein the outer-layer pipe comprises a laminate comprising the layer comprising the resin composition.

14. An insulated multilayered pipe according to claim 13, wherein the outer-layer pipe comprises a layer comprising a thermoplastic resin, a layer comprising an adhesive resin, and the layer comprising the resin composition.

15. An insulated multilayered pipe according to claim 14, wherein the outer-layer pipe has three-layer configuration of T/Ad/E in which the E layer is arranged inwards from the T layer, where T layer is the layer comprising the thermoplastic resin, Ad layer is the layer comprising an adhesive resin, and E layer is the layer comprising the resin composition.

16. A method for producing the insulated multilayered pipe according to claim 13, the method comprising inserting the inner pipe inside the outer-layer pipe, fixing the inner pipe with a spacer to form a double pipe, and then pouring a foam feedstock in a space between the inner pipe and the outer-layer pipe and hardening.

17. The method for producing the insulated multilayered pipe according to claim 16, wherein the outer-layer pipe is molded by co-extrusion molding.

18. The method for producing the insulated multilayered pipe according to claim 17, comprising molding the outer-layer pipe by extrusion molding followed by cooling with water having a temperature of 10 to 70° C. immediately after the molding.

19. The method for producing the insulated multilayered pipe according to claim 17, wherein the outer-layer pipe is molded by co-extrusion molding.

* * * * *